Jan. 13, 1942.  F. D. WILSON ET AL  2,269,502
AUTOMOTIVE DIGGING, GATHERING, CARRYING, AND LEVELING SCRAPER
Filed May 11, 1938  6 Sheets-Sheet 1
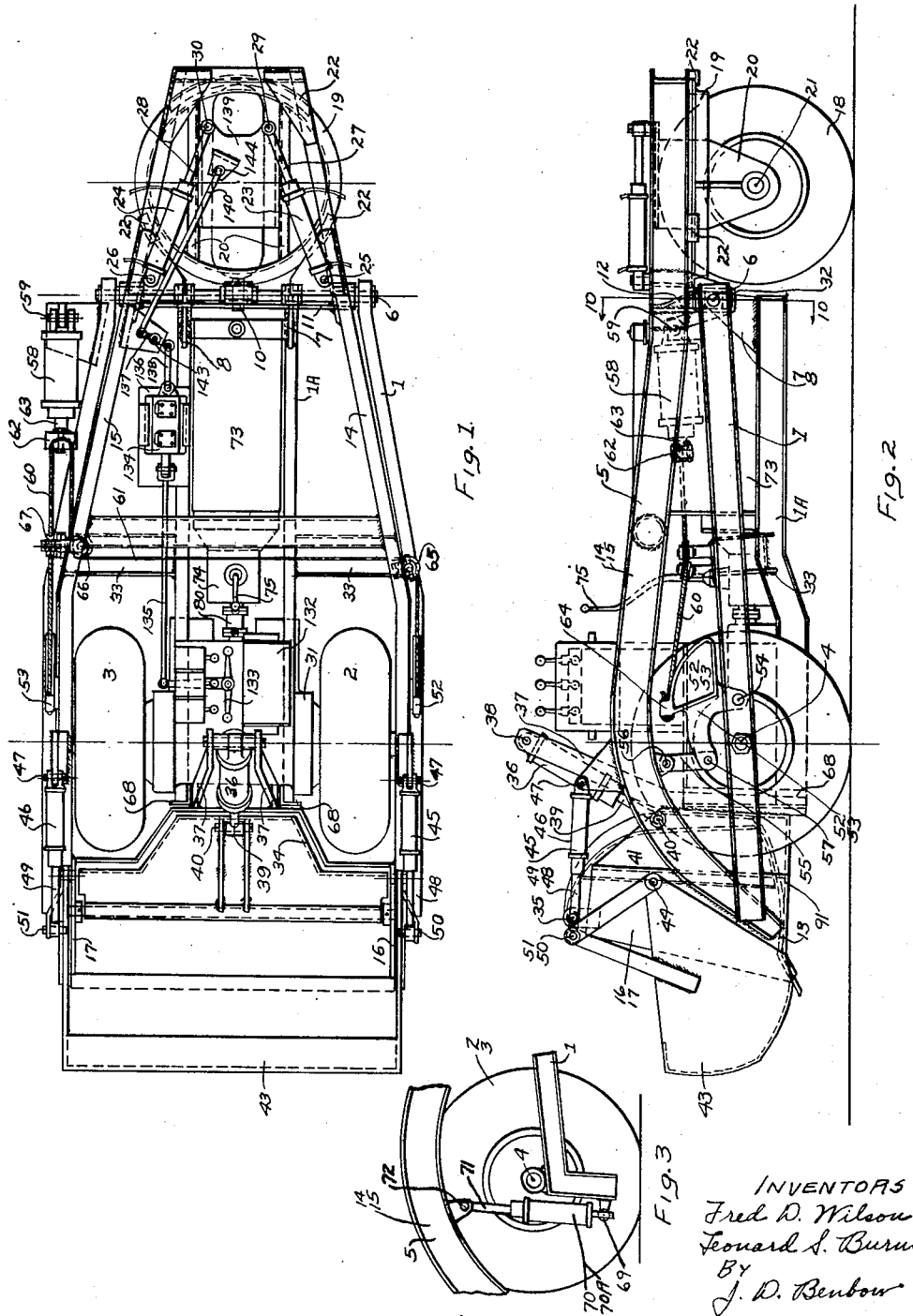
INVENTORS
Fred D. Wilson
Leonard S. Burns
BY
J. D. Benbow Jan. 13, 1942.  F. D. WILSON ET AL  2,269,502
AUTOMOTIVE DIGGING, GATHERING, CARRYING, AND LEVELING SCRAPER
Filed May 11, 1938    6 Sheets-Sheet 2

INVENTORS
Fred D. Wilson
Leonard S. Burns
BY
J. D. Benbow

Jan. 13, 1942.                F. D. WILSON ET AL                 2,269,502
            AUTOMOTIVE DIGGING, GATHERING, CARRYING, AND LEVELING SCRAPER
                         Filed May 11, 1938           6 Sheets-Sheet 3
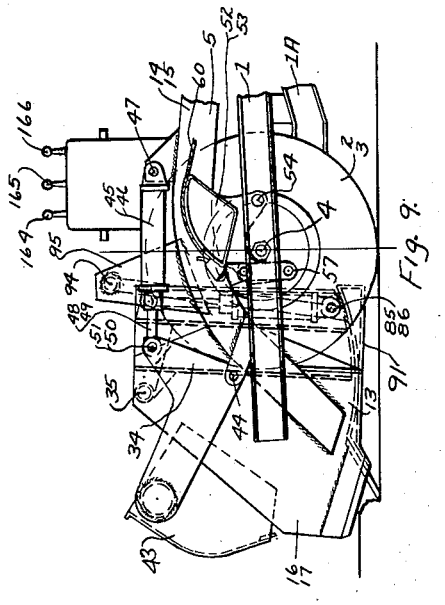
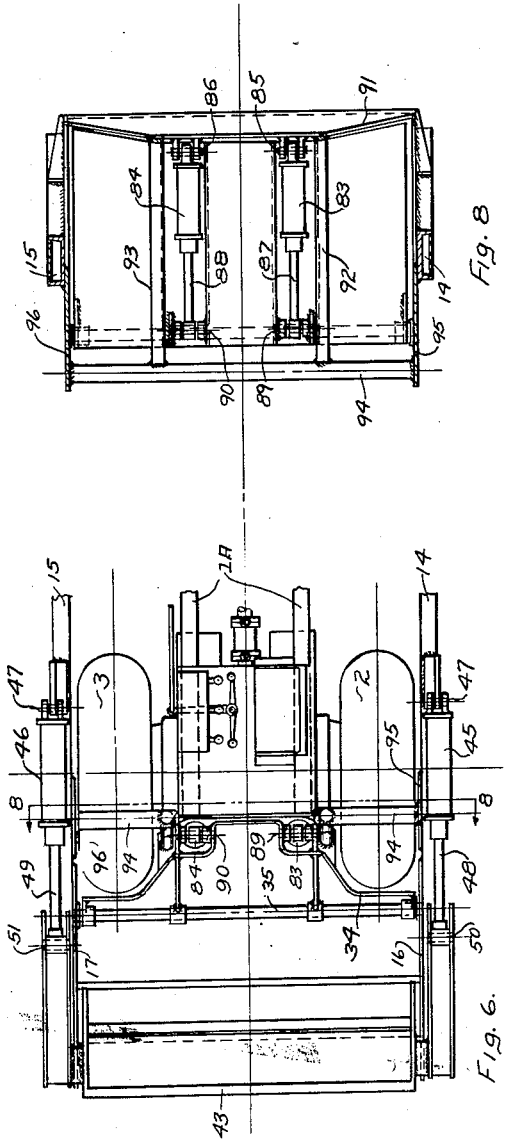
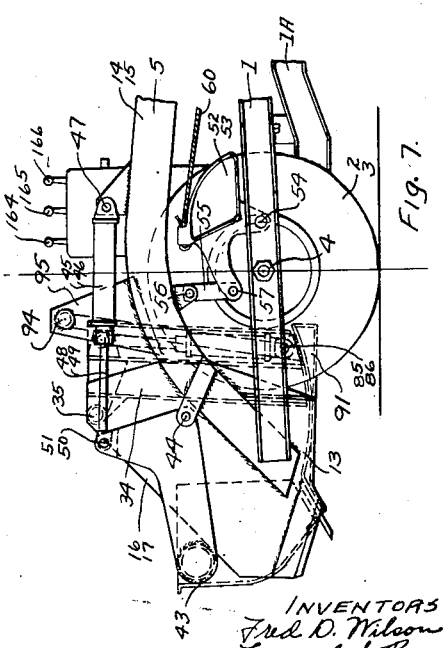
INVENTORS
Fred D. Wilson
Leonard S. Burns
BY
J. D. Benbow Jan. 13, 1942.   F. D. WILSON ET AL   2,269,502
AUTOMOTIVE DIGGING, GATHERING, CARRYING, AND LEVELING SCRAPER
Filed May 11, 1938   6 Sheets-Sheet 4

INVENTORS
Fred D. Wilson
Leonard S. Burns
BY
J. D. Benbow

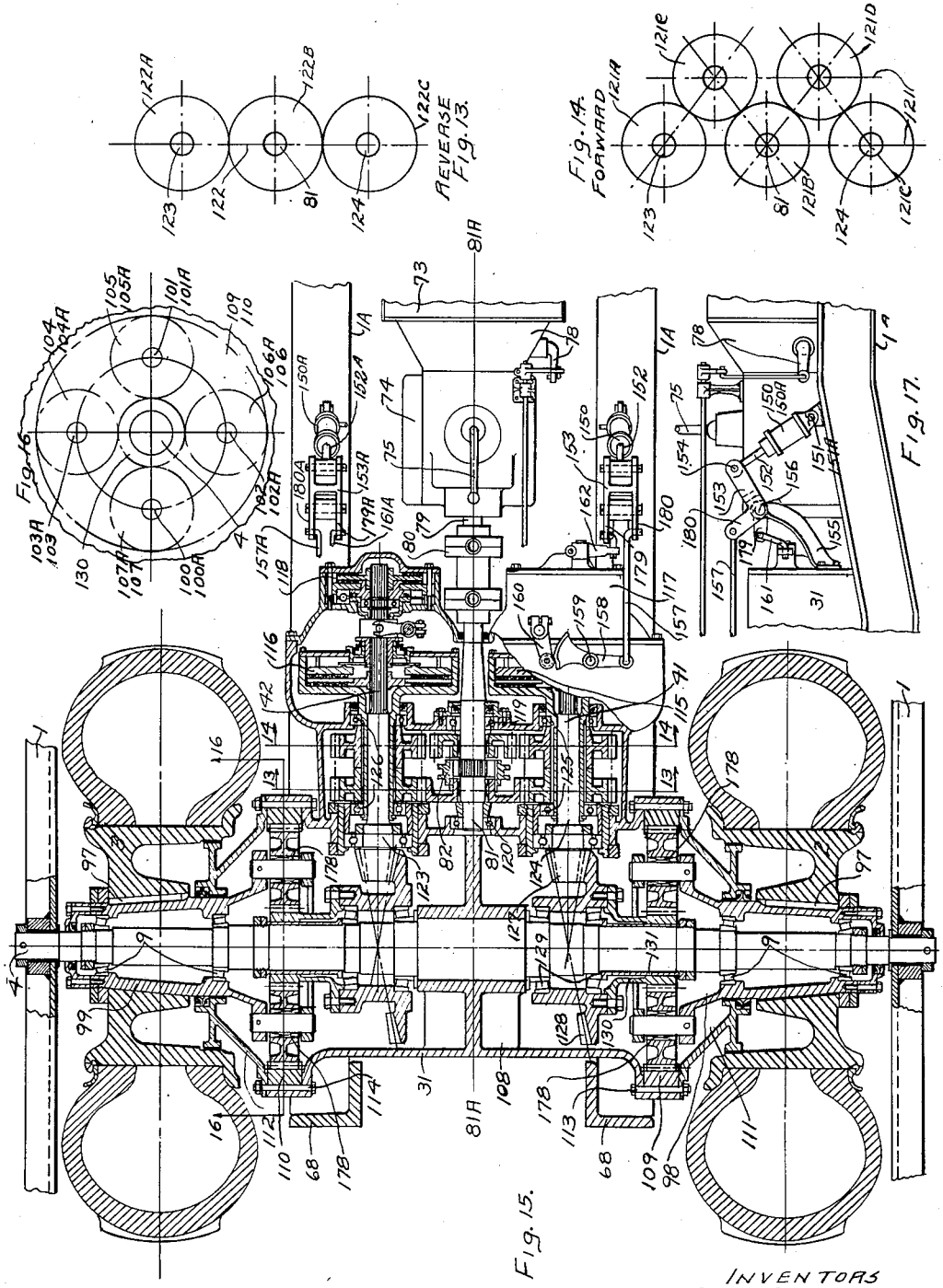

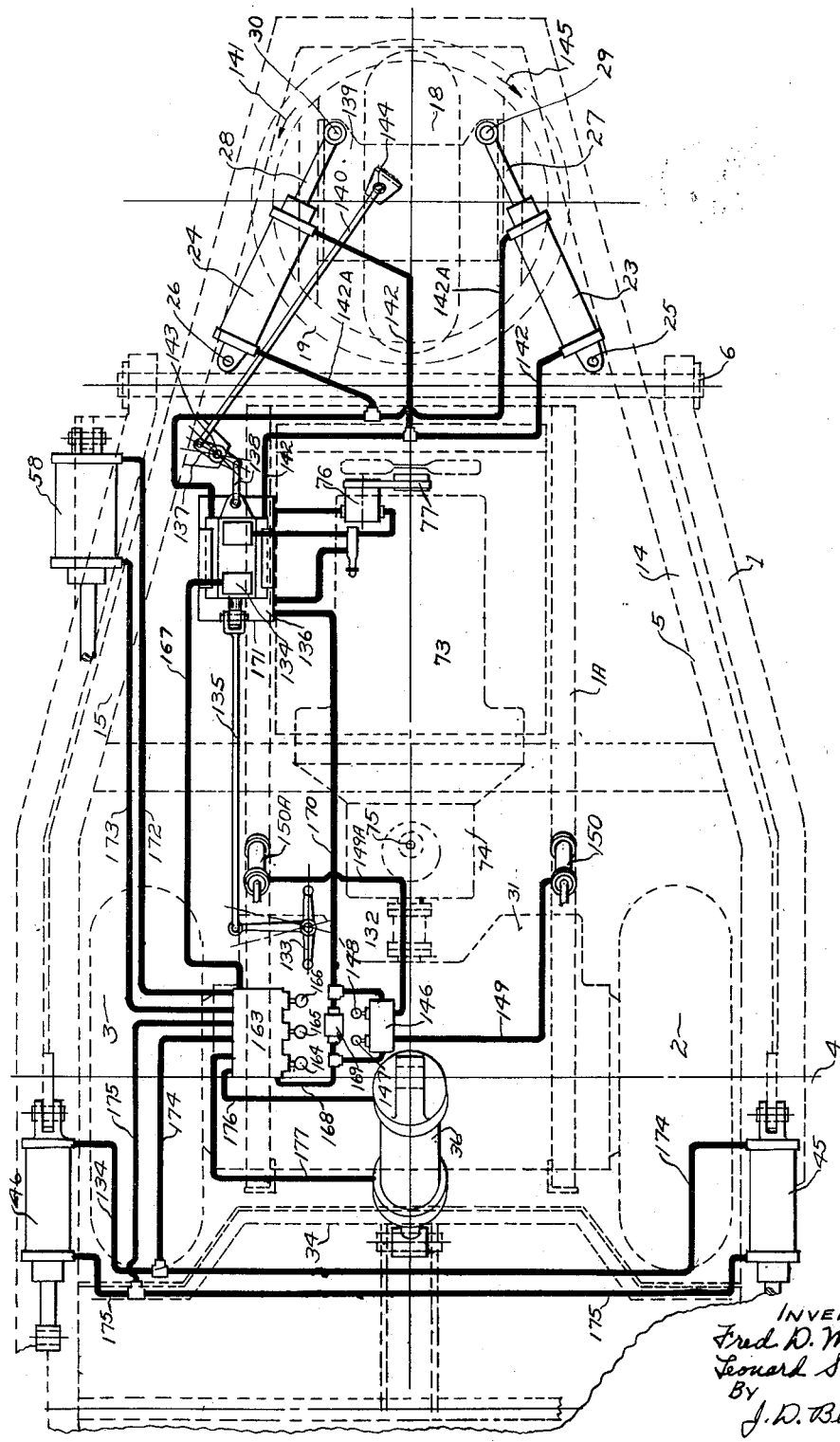

Patented Jan. 13, 1942

2,269,502

UNITED STATES PATENT OFFICE 2,269,502

AUTOMOTIVE DIGGING, GATHERING, CARRYING, AND LEVELING SCRAPER

Fred D. Wilson and Leonard S. Burns, Aurora, Ill., assignors to Western-Austin Company, Aurora, Ill., a corporation of Illinois Application May 11, 1938, Serial No. 207,360

13 Claims. (Cl. 37—124)

The present invention relates to digging, gathering, carrying and leveling scrapers, but particularly to that class of self-propelled moving and hauling machines which digs, gathers, carries and discharges dirt for road and other construction purposes and is operated by one man. The machine of the present invention differs very materially from other machines, as at present designed and used, in that the material digging, gathering, carrying and discharging means, or the scraper bowl, is located at an end of the unit and the unit itself is not only self-propelled but is designed to be steered and to travel in either direction, having equal traveling speeds in either direction.

The idea underlying this invention involves utilizing to the maximum the tractor or prime mover employed and it is for this reason that we employ an unusual number of traveling speeds in either direction. For instance, it is quite obvious that the digging and gathering operation requires a relatively low traveling speed because of the resistance to the propelling wheels at such a time, but after the digging and gathering operation has been completed and the carrying operation started, the tractor or prime mover in our machine is easily capable of moving the machine at a much greater speed than herebefore and we are able (by having several higher speeds) to choose the highest speed under which the tractor or prime mover can operate, ground conditions considered. It will therefore be seen that, with an arrangement as herein described, we are able to reduce to a minimum the time required in traveling from the digging and gathering point to the discharging point, thus operating the tractor or prime mover at its maximum efficiency at all times.

Dirt moving methods of today generally involve two separate units, the tractor or prime mover and the scraping element, which is usually pulled and controlled from the tractor. In a combination of this kind, the weight of the tractor must necessarily be sufficient, thru its adhesion to the ground, to not only pull the scraping element when traveling but to pull it during the digging and gathering operation, which obviously is the principal cause of present day tractors being so heavy. Also, in a dual combination of this kind, the weight of the material after it is gathered in the scraper bowl is in no way used to increase the tractive weight, and therefore the traction, of the tractor, as it is in our invention. Obviously, this means that the total weight of the two units must, of necessity, be far greater than a combination built along the lines outlined in our present invention. Also, the excess weight of the other combination units not only serves to increase the first cost but also the depreciation and operating expense, to say nothing about the loss of efficiency and time due to the turning which is necessary at both the digging and gathering point and the discharging point.

Attention is called to two outstanding features of our present invention. First, it has been found in actual practice that, as the scraper bowl is placed in the digging and gathering position and the material begins to flow into it, the resistance to forward movement increases due to the accumulation of material in the scraper bowl. This additional weight increases the adhesion of the driving wheels in proportion thereto. Second, the location of the scraper bowl being at one end of the vehicle, not only provides a clean flat even track for the driving wheels but also permits the discharging of material over the edge of an embankment, which is always necessary when widening roads or filling around new bridges and culverts, or building the type of construction conventionally known as over-passes.

One of the objects of this invention is to provide a self-propelled scraper having the scraper mounted at one end of the frame with means for raising and lowering the scraper bowl to control the depth of the cut made by the scraper and also to control the height of the material being emptied from said scraper bowl, thus spreading an even depth of material at any desired place.

Another object of this invention is to provide an automotive machine adapted for traveling in either direction and equipped with manual or power controlled steering means on one end and a scraper bowl with means to control the depth of the cut on the other end.

Another object of this invention is to provide an automotive machine adapted to be driven and steered in either direction, having a scraper bowl with a controlled apron for holding material located at an end of the machine, and means at the operator's station to steer either end separately or both ends together and to raise, lower and control the apron and unload the scraper bowl.

Another object of this invention is to provide an automotive machine equipped with ground contacting propelling means ahead of the power means, and ground contacting steering means in the rear of the power means.

Another object of this invention is to provide an automotive machine for moving material, comprising a frame with a self-propelled unit pivotally mounted to the material carrying and steering frame.

Another object of this invention is to provide an automotive machine having independently power driven wheels directly adjacent the scraper bowl, said wheels being located between the scraper bowl and the steering wheel, and an operator's station wherefrom the operator can control all the movements of the above mentioned means.

Another object of this invention is to provide an automotive machine provided with two driven ground-contacting propelling units, each independently connected to the motor and each equipped with an independent manual or power controlled clutch and brake for the purpose of retarding or stopping either of the said propelling units and to assist a third ground-contacting unit in steering.

Another object of this invention is to provide an automotive machine adapted to travel in either direction and equipped with the same number of speeds for traveling in either direction, the scraper bowl being so located relative to the supporting means that it is easily possible to discharge its contents beyond the edge of an embankment.

Another object of this invention is to provide an automotive machine that can be used for leveling, as all supporting wheels traveling on the planed surface will permit setting the cutting edge of the scraper bowl to smooth the high spots, thus depositing this excess material in the scraper bowl until it is required to be discharged for filling the low spots.

Another object of this invention is to provide a material digging, gathering, carrying and discharging scraper comprising a main frame, power driven wheels mounted at one end with a power plant and power raising and lowering device, and an auxiliary frame supported by a steering wheel with a scraper bowl and apron on the other end in front of the power driven wheels and main frame, one end of the main frame being pivotally connected to the auxiliary frame in front of the steering wheel and the other end having a power raising and lowering means supporting the auxiliary frame and scraper bowl.

Another object of this invention is to provide an automotive machine wherein the independently controlled power driven units receive their power from one power plant and the power driven units can be controlled independently or together.

Further objects of this invention are to provide a construction of maximum simplicity, efficiency, economy and ease of assembly and operation, and such further objects, advantages and capabilities as will later more fully appear and are inherently possessed thereby.

The invention further resides in the combination, construction and arrangement of parts illustrated in the accompanying drawings and, while we have shown therein a preferred embodiment, it is to be understood that the same is susceptible of modification and change without departing from the spirit of the invention.

In the drawings:

Figure 1 is a plan view of the automotive scraper.

Figure 2 is a side elevation showing the cable and bell crank connected to a single hydraulic cylinder for raising and lowering the scraper bowl and the auxiliary frame.

Figure 3 is a front portion of the side elevation showing hydraulic means connected direct to the main and auxiliary frames for raising and lowering the scraper bowl and auxiliary frame.

Figure 6 is a front portion of a plan view showing the method of employing two cylinders for moving the back of the scraper bowl to unload the scraper bowl.

Figure 7 is a side elevation of Figure 6.

Figure 8 is a sectional view at 8—8 of Figure 6.

Figure 9 is the digging position of Figures 6 and 7.

Figure 13 shows the train of gears at 13—13 of Figure 15.

Figure 14 shows the train of gears at 14—14 of Figure 15.

Figure 15 is a cross section of the main axle and wheels, auxiliary transmissions, clutches and brakes, and the main shaft which is connected to the power plant.

Figure 16 shows the train of gears and a portion of axle housing at line 16—16 of Figure 15.

Figure 17 is a portion of the side elevation of Figure 15 showing a part of the clutch control.

Figure 18 is a schematic drawing showing the hydraulic control of the steering, clutching and declutching and braking, raising and lowering of the scraper bowl, opening and closing of the apron and the moving of the back of the scraper bowl for dumping.

Figure 4:
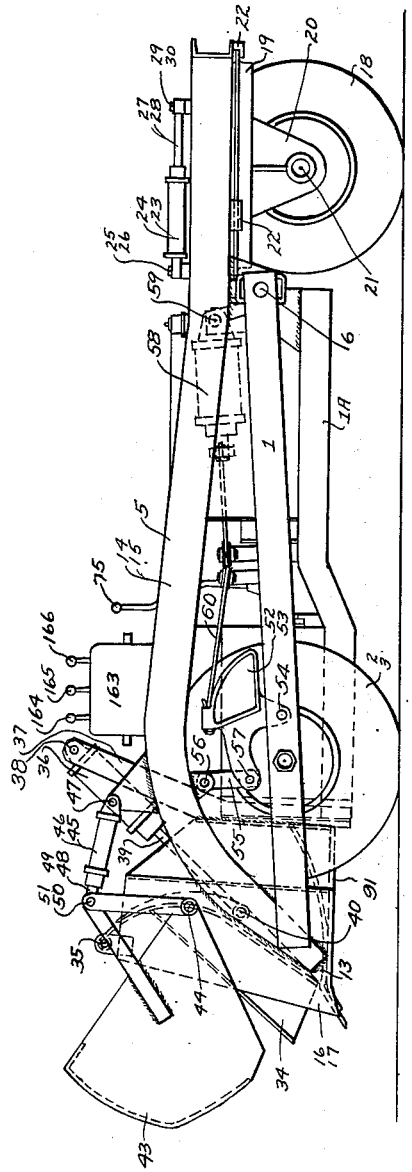
Figure 4 shows the side elevation and the dumping position of the scraper bowl.

Referring to the drawings, the automotive scraper comprises a main frame 1 and sub-frame 1a, having front driving wheels 2 and 3 attached to the main frame 1 by stationary axle 4. The main frame 1 and the sub-frame 1a, at the opposite end from the wheels 2 and 3, are supported by shaft 6, which is attached to the auxiliary frame 5. The sub-frame 1a is attached to shaft 6 by bearings 7 and 8. The main frame 1 and the sub-frame 1a oscillate in relation to auxiliary frame 5 about pin 10, which is attached to plate 11 and reinforcement 12, which in turn is attached to auxiliary frame 5, and the outer ends of shaft 6 are guided in this oscillating movement by the guide members 32, which are attached to the auxiliary frame 5. The forward end of sub-frame 1a is attached to the axle housing 31 of wheels 2 and 3 by vertical connections 68. Intermediate of the axle housing 31 and shaft 6, cross members 33 connect sub-frame 1a to main frame 1.

The auxiliary frame 5 in supported at the end opposite the driving wheels 2 and 3 of the main frame 1 by rotatable steering wheel 18. At the forward end of auxiliary frame 5, the side plates 16 and 17 of scraper bowl 13 are attached to the two side members 14 and 15 of the auxiliary frame 5 by welding, riveting, bolting or any other method which may be preferred. Opposite the scraper bowl 13 is the rotatable steering wheel 18, mounted on a rotatable circle frame 19 to which are attached depending arms 20, which form supports for the axle 21 of the said rotatable steering wheel 18. The rotatable steering wheel 18 is mounted on axle 21 by roller bearings or any other form of bearing. The rotatable steering wheel 18 and the rotatable circle frame 19 rotate in the guides 22, while are attached to the auxiliary frame 5, by means of hydraulic cylinders 23 and 24. Hydraulic cylinders 23 and 24 are attached to the auxiliary frame 5 by pin connections 25 and 26 and the piston rods 27 and 28 are fastened to the rotatable circle frame 19 by pins 29 and 30.

The scraper bowl 13 has a movable back 34, swingable about shaft 35, which is connected to the two side plates 16 and 17 of the scraper bowl 13. A hydraulic cylinder 36 is mounted on the bottom 91 of the scraper bowl 13 by means of vertical members 37 and by pin 38. The piston 39 is attached to the movable back 34 by pin 40. By admitting pressure on the top side of hydraulic cylinder 36, the piston 39 will be extended and will automatically move the movable back 34 forward to dump or to push out the load in the scraper bowl 13.

Figures 6, 7, 8 and 9 illustrate another method of moving the movable back 34 of the scraper bowl 13; that is, by the use of two hydraulic cylinders 83 and 84, which are attached to the bottom 91 of the scraper bowl 13 by pins 85 and 86. The piston rods 87 and 88 are attached to the movable back 34 by pins 89 and 90. In addition to the side plates 16 and 17 of the scraper bowl 13, there are vertical members 92 and 93, the lower ends of which are welded to the bottom 91 of the scraper bowl 13 and the upper ends of which are welded to a horizontal cross member 94, which is in turn attached to the side members 14 and 15 of the auxiliary frame 5 by gussets 95 and 96. This construction is used to stiffen the center of bottom 91 of the scraper bowl 13 and also to take the pull exerted by the hydraulic cylinders 83 and 84 in moving the movable back 34 during the dumping of the load.

Figure 5:
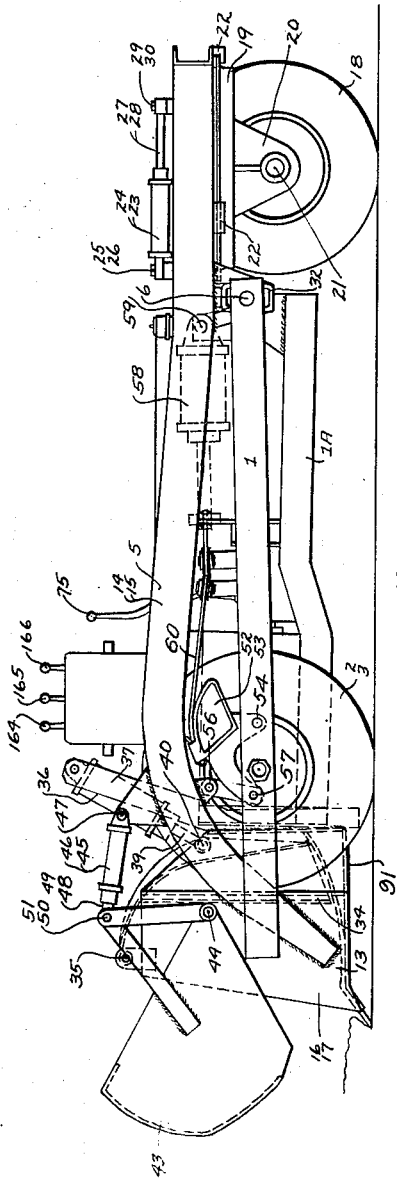
Figure 5 is a side elevation showing the digging position of the scraper bowl.
Figure 10:
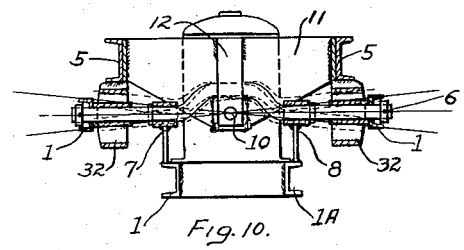
Figure 10 is a sectional view of Figure 2 at 10—10.
Figure 11:
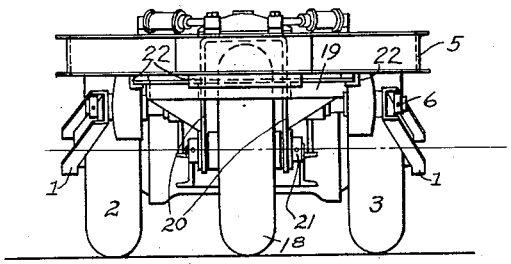
Figure 11 is a rear elevation of Figure 2.
Figure 12:
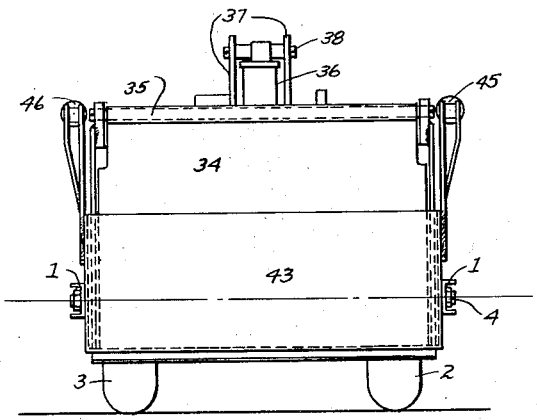
Figure 12 is a front elevation of Figure 2.

The construction shown in Figures 1, 2, 4 and 5 illustrates a single cylinder 36 which pushes the movable back 34, while the construction shown in Figures 6, 7, 8 and 9 illustrates the use of two hydraulic cylinders 83 and 84 which pull the movable back 34 in dumping the load. The operation is similar in both methods.

The apron 43, which prevents material from spilling out of the scraper bowl 13, is mounted to the side plates 16 and 17 of the scraper bowl 13 by pins 44 to permit the opening and closing of the apron 43. The opening and closing of the apron 43 is accomplished by hydraulic cylinders 45 and 46, which are attached to the side members 14 and 15 of auxiliary frame 5 by pins 47. The pistons 48 and 49 are attached to the apron 43 by pins 50 and 51. Directly in back of stationary axle 4 on the side members of the main frame 1 are mounted bell cranks 52 and 53 by means of pins 54 and the lower ends of vertical links 55 are attached to the bell cranks 52 and 53 by pins 57 while the upper ends of links 55 are attached to the side members 14 and 15 of the auxiliary frame 5 by pins 56.

Mounted on the main frame 1 is hydraulic cylinder 58 (Figs. 1, 2, 4, 7, 9 and 18), which is attached to the main frame 1 by pin 59 with cables 60 and 61 attached to the cross head 62 of the piston 63. The cables 60 and 61 are in turn attached to the upper portions 64 of the bell cranks 52 and 53. The upper portions 64 of the bell cranks 52 and 53 are circular in shape and the cables 60 and 61 are threaded thru sheave wheels 65, 66 and 67. By admitting oil in hydraulic cylinder 58, we can automatically raise or lower the scraper bowl 13 and the auxiliary frame 5 and control the depth of the cut as well as the position of the scraper bowl 13 when transporting material. This is a floating mechanism.

Another method of raising and lowering the scraper bowl 13 and the auxiliary frame 5 is shown in Figure 3 and consists of ball and socket joints 69 attached to the side members of the main frame 1, having mounted thereon hydraulic cylinders 70 and 70a with piston rods 71 and 71a connected to the side members 14 and 15 of the auxiliary frame 5 by pins 72. By admitting oil, or any other fluid pressure means, into the cylinders 70 and 70a, the raising and lowering of the scraper bowl 13 and the auxiliary frame 5 is accomplished. This is a more rigid mechanism.

Referring to Figure 15, wheels 2 and 3 have a taper fit and a key 97 mounted on the floating axles 98 and 99, which in turn are mounted on the stationary axle 4 by means of roller bearings 9. On the inner ends of each of the floating axles 98 and 99 are mounted four shafts 100, 101, 102 and 103 and 100a, 101a, 102a and 103a with roller bearings 178 on which the planetary gears 104, 105, 106 and 107 and 104a, 105a, 106a and 107a are mounted. (See Figure 16 for arrangement.) The axle housing 31 is made of three parts. The center part 108 also forms a support for the stationary axle 4. At each end of the center part 108 of axle housing 31 are internal gears 109 and 110 which mesh with gears 104, 105, 106 and 107 and 104a, 105a, 106a and 107a. At the outside of the internal gears 109 and 110 are dust protectors 111 and 112. The dust protectors 111 and 112 and internal gears 109 and 110 are bolted to the center part 108 of axle housing 31 by bolts 113 and 114, thus forming an integral housing.

Power plant 73 is mounted on the sub-frame 1a, said power plant 73 having the usual transmission 74 for changing the speed with the clutch 78 having an extension for operation by foot pedal on the operator's station 132, and gear shift lever 75 mounted thereon. Mounted on the power plant 73, preferably at the front end, is a hydraulic pump 76 which is driven by the fan shaft 77 for the purpose of supplying pressure to the various hydraulic cylinders. Main shaft 79 of the power plant 73 is extended to universal joints 80, to which is attached a main drive shaft 81 of auxiliary transmissions 41 and 42. Auxiliary transmission 41 is for the purpose of driving and controlling wheel 2 and auxiliary transmission 42 is for the purpose of driving and controlling wheel 3. The auxiliary transmissions 41 and 42 have auxiliary clutches 115 and 116 with brakes 117 and 118.

Main drive shaft 81 is supported in the axle housing 31 by ball bearings 119 and 120. Intermediate the train of gears 121 shown on Figure 14 and the train of gears 122 shown on Figure 13 (corresponding to lines 13—13 and 14—14 on Figure 15), is a shifting gear 82 which can be shifted either to the right or to the left, depending on the direction of travel desired. You will note that by shifting the shifting gear 82 to the right, the train of gears 121 shown in Figure 14 will drive the wheels 2 and 3 forward, that is in the direction to load the scraper, and by shifting the shifting gear 82 to the left, the train of gears 122 shown in Figure 13 reverse the direction of the wheels 2 and 3 and move the scraper away from the loading point. Gears 121a and 122a are mounted on spline shaft 123 and gears 121c and 122c are mounted on spline shaft 124. Auxiliary clutch 116 and brake 118 are also mounted on spline shaft 123 and auxiliary clutch 115 and brake 117 are mounted on spline shaft 124. Spline shaft 124 is mounted in the axle housing 31 on roller bearings 125 and spline shaft 123 is mounted in the axle housing 31 on roller bearings 126. Spline shaft 124 has beveled pinion 127 mounted thereon, which drives beveled gear 128, which is mounted on stationary axle 4 on roller bearings 129. At the side nearest the wheel 2 is a gear 130 which revolves on brass bearing 131 which is mounted on stationary axle 4. The gear 130 in turn drives the train of gears 104, 105, 106 and 107 which are mounted on shafts 100, 101, 102 and 103 and cause the floating axle 98 upon which the wheel 2 is mounted to revolve.

The arrangement of gears, floating axles, etc., is duplicated for the purpose of driving wheel 3. Thus it is seen that the operator on the operator's station can declutch either clutch 115 or 116 and brake either brake 117 or 118, as desired. When the shifting gear 82 is in mesh with the train of gears 121 shown in Figure 14, the machine will be going forward and, should the operator desire to make a quick turn to the left, he will steer the rotatable steering wheel 18 and also declutch the clutch 116 and apply the brake 118, which will cause wheel 3 to remain stationary and thus allow wheel 2 to revolve about wheel 3. It can be readily seen that by using this combination, the machine can turn in a very narrow space.

The main steering means is the rotatable steering wheel 18 which is rotated in the direction desired by hydraulic cylinders 23 and 24 (see Figs. 1, 2, 4, 5 and 18) and controlled from the operator's station 132 by means of steering lever 133, which operates the steering control valve 134 by means of connecting rod 135. The steering control valve 134 is slidably mounted on a plate 136 which is attached to the sub-frame 1a. The opposite end of the steering control valve 134 is attached to one end of lever 137 by connecting rod 138. Lever 137 is attached to the side member 15 of auxiliary frame 5 by fulcrum 143 and the opposite end of lever 137 is connected to the circle plate 139 of circle frame 19 by connecting rod 140 at 144.

Assuming that we wish to rotate the rotatable steering wheel 18 and circle frame 19 with its circle plate 139 in the direction of the arrow 141, the operator turns the steering lever 133 clockwise and the fluid will flow thru the pipe line 142 to the under side of hydraulic cylinder 24, exerting a pulling action on piston rod 28, while the fluid will be applied to the upper part of hydraulic cylinder 23, which will exert a pushing action on piston rod 27. Thus the power of both hydraulic cylinder 23 and 24 is exerted to rotate the rotatable steering wheel 18 and circle frame 19 with its circle plate 139 in the direction of arrow 141. By rotating the rotatable steering wheel 18 and circle frame 19 with its circle plate 139 in the direction of arrow 141, the connecting rod 140, which is attached to the circle plate 139 at 144, will exert a pushing action on the lever 137 and a pulling action on the connecting rod 138, which is attached to the lever 137 and steering control valve 134, causing the steering control valve 134 to slide toward hydraulic cylinder 24. This action will close the steering control valve 134 and stop the rotation of the rotatable steering wheel 18 unless the operator continues to turn steering lever 133 and moves connecting rod 135 in the same direction; that is, follows the steering control valve 134 as it moves.

The operator at the operator's station 132 has full control of the movement, or steering, of the rotatable steering wheel 18, which is caused by its rotation on the circle frame 19. If it is desired to rotate the rotatable steering wheel 18 in the direction of arrow 145, the steering lever 133 is turned in a counterclockwise direction and the fluid will flow thru the pipe line 142A to the upper side of hydraulic cylinder 24 and the under side of hydraulic cylinder 23. Thus, it is readily seen that the control of the rotatable steering wheel 18 is dependent on the direction of the movement of the steering lever 133 and by the operation of steering lever 133 and the use of either control lever 147 or 148, the scraper can be turned in a very short radius and can be moved quickly in and out of narrow spaces, and it also can be operated either forward or backward at the same speed and the brakes can be applied to each wheel individually or to both wheels together at one time. The turning can be accomplished in either direction by the control levers 133, 147 and 148. The driving wheels 2 and 3 can also be used to assist in making a shorter turn than is possible by using only the rotatable steering wheel 18.

The combination as described and illustrated increases the ability of the scraper to maneuver in places where it would be impossible to operate a tractor-drawn scraper. This is strictly a one-man scraper, where the operator has full view of the loading as well as the dumping of the scraper without turning about, as it is necessary to do when operating a tractor-drawn scraper.

The control valve 146, located at the operator's station 132 with control levers 147 and 148, is manipulated by independent foot levers which are not shown. Operating the foot pedal attached to control lever 147 will allow the fluid to flow thru the tube 149 to the cylinder 150 which is connected to the sub-frame 1a by pin 151 and will cause a pull to be exerted on piston rod 152 which is connected to dual bell crank 153 by pin 154, dual bell crank 153 being mounted on the axle housing 31 by bracket 155 and pin 156 (see Figs. 15, 17 and 18). One arm 180 of dual bell crank 153 is connected to connecting rod 157, the other end of connecting rod 157 being attached to lever 158 which is mounted on the top of axle housing 31 by pin 159. The opposite end of lever 158 engages the declutching lever 160 and at the same time, by means of another arm 179 of dual bell crank 153, connecting rod 161 is attached to the brake operating lever 162 which controls the brake 117 on spline shaft 124 and applies the brake.

By this operation the wheel 2 is prevented from revolving while the wheel 3 will revolve and assist the rotatable steering wheel 18 in making a very short turn.

The same operation can be performed on the opposite side by means of cylinder 150a. Operating the foot pedal attached to control lever 148 will allow the fluid to flow thru the tube 149a to the cylinder 150a which is connected to the sub-frame 1a by pin 151a and will cause a pull to be exerted on piston rod 152a which is connected to dual bell crank 153a by pin 154a, dual bell crank 153a being mounted on the axle housing 31 by bracket 155a and pin 156a. One arm 180a of dual bell crank 153a is connected to connecting rod 157a, the other end of connecting rod 157a being attached to lever 158a which is mounted on the top of axle housing 31 by pin 159a. The opposite end of lever 158a engages the declutching lever 160a and at the same time, by means of another arm 179a of dual bell crank 153a, connecting rod 161a is attached to the brake operating lever 162a which controls the brake 118 on spline shaft 123 and applies the brake.

Mounted at the operator's station is a multiple control valve 163 with control levers 164, 165 and 166. The hydraulic pump 76 supplies the fluid under pressure thru the steering control valve 134 out thru the tubing 167 into the multiple valve 163, and the fluid will by-pass thru the multiple valve 163 thru tubing 168, which supplies the fluid under pressure to control valve 146. There is a by-pass in the tubing 168 which permits the excess fluid to flow thru check valve 169 and back thru tubing 170 to the tank 171 which is mounted on sub-frame 1a. Constant pressure is maintained in multiple valve 163, which permits the operation of either the control lever 164, 165, 166 when desired. Control lever 166 controls the raising and lowering of the scraper bowl 13 and the auxiliary frame 5, as before explained, by means of hydraulic cylinder 58, allowing the fluid to flow thru tube 172 or 173 as desired. Control lever 165 controls the movement of the opening and closing of the apron 43 by admitting fluid under pressure thru the tubes 174 and 175 to the hydraulic cylinders 45 and 46, depending on the direction of movement desired; that is, opening or closing. The control lever 164 controls the movement of the movable back 34 by admitting fluid under pressure to hydraulic cylinder 36 thru tubes 176 and 177, depending upon whether its movement is outward or inward. This same lever can be used in controlling the two cylinders 83 and 84 by the proper connections of the tubing 176 and 177. Thus, all the control levers are located at the operator's station for the control of the raising and lowering of the scraper bowl 13 and the auxiliary frame 5, the opening and closing of the apron 43 and the movement of the movable back 34 of the scraper bowl 13.

By the use of cables 60 and 61, which are attached to the cylinder 58 which controls the raising and lowering of the scraper bowl 13 and the auxiliary frame 5, the scraper bowl 13 can float or tilt, so to speak, in case it hits an obstruction on one side of the scraper bowl 13 during the movement of the machine either in a forward or a backward direction.

Thus, it is readily seen that by the use of the controls provided, the scraper can be used to accomplish more work during a given length of time than a scraper which has to be attached to a tractor.

We claim:

1. In a self-propelled scraper, in combination, a main and auxiliary frame, a scraper bowl mounted at one end of the auxiliary frame and a rotatable steering wheel mounted on and supporting the opposite end, power means and a sub-frame mounted on the main frame, independently controlled power driven wheels with clutching, declutching and braking means at the back of the scraper bowl supporting one end of the main frame and the opposite end of said main frame connected to the auxiliary frame for oscillating movement, means mounted on the main frame and connected to the auxiliary frame for raising and lowering the auxiliary frame and the scraper bowl, an operator's station mounted on the main frame with independent control means for raising, lowering and emptying the scraper bowl and to control the steering of the rotatable steering wheel and to independently or simultaneously control the rotation, clutching, declutching and braking of the power driven wheels.

2. In a self-propelled scraper, in combination, a main frame and an auxiliary frame, said auxiliary frame with scraper bowl and control means mounted on the front end and a rotatable steering wheel with steering means mounted on and supporting the rear end, said main frame supported at the front end in back of the scraper bowl by independently power driven wheels with control means and at the rear end attached to the said auxiliary frame, power means and an operator's station mounted on said main frame, raising and lowering means mounted on the said main frame and attached to the said auxiliary frame, independent control means at the operator's station to independently control the power driven wheels, steer the rotatable steering wheel and control all the movements of the scraper.

3. In a self-propelled scraper, in combination, a main frame and an auxiliary frame, a scraper bowl with movable back and apron mounted on one end of said auxiliary frame with a steerable wheel supporting the opposite end, independent power driven wheels supporting one end of said main frame in back of said scraper bowl and the opposite end supported by said auxiliary frame, means for raising, lowering and moving the movable back and apron of said scraper bowl mounted on said auxiliary frame, independent control means for each power driven wheel, an operator's station on said main frame with independent control means to steer the steerable wheel, clutch, declutch, brake and rotate the power driven wheels and control all the movements of the scraper.

4. In a self-propelled scraper, in combination, a main frame and an auxiliary frame, a scraper bowl with movable back and apron mounted on one end of said auxiliary frame and a steerable wheel supporting the opposite end, independent power driven wheels supporting said main frame in back of said scraper bowl and the opposite end supported by said auxiliary frame, independent control means for each power driven wheel and the steerable wheel, means for raising, lowering and moving the movable back and apron of said scraper bowl mounted on said auxiliary frame, an operator's station and power means on said main frame, control means on the operator's station to control all movements of the scraper and the steerable wheel and the forward and backward movement of the independent power driven wheels to carry the load in the scraper bowl as fast in one direction as in the opposite direction.

5. In a machine of the class described, in combination, a main frame and an auxiliary frame, said main frame supported by independently controlled power driven wheels at one end and at the opposite end by said auxiliary frame, raising and lowering means mounted between said main frame and said auxiliary frame supporting one end of said auxiliary frame and steering means supporting the opposite end, a material digging and carrying device carried by the said auxiliary frame adapted to cut a path for the independently controlled power driven wheels when digging and to discharge material over an embankment when dumping, an operator's station and power means having transmission mechanism arranged for a plurality of equal speeds in both directions, making turning unnecessary, means mounted at the operator's station to control the movements of the said power driven wheels and the movements of the material digging and carrying device and the auxiliary frame.

6. In a self-propelled machine of the class described, in combination, a main frame and an auxiliary frame supported by independently power driven wheels and a rotatable steering wheel, said auxiliary frame having at one end a scraper bowl with a movable back and apron mounted thereon projecting forwardly of the said power driven wheels and supported by said main frame and the said rotatable steering wheel mounted on and supporting the opposite end, said independently power driven wheels with control mechanism supporting one end of said main frame and the opposite end pivotally attached to said auxiliary frame in front of said rotatable steering wheel, means mounted on the said main frame to raise and lower the scraper bowl and said auxiliary frame, an operator's station and power means on said main frame, control means at the operator's station for independently steering the said rotatable steering wheel and controlling the rotation, clutching, declutching and braking of the said independently power driven wheels, and the raising and lowering of the scraper bowl and said auxiliary frame.

7. In a self-propelled scraper, in combination, a main frame and an auxiliary frame, independently controlled power driven wheels supporting one end of the main frame and the opposite end connected to the auxiliary frame, a power plant having two auxiliary transmissions independently connected to said power driven wheels with independent controls mounted on said main frame, a scraper bowl attached to one end of the auxiliary frame and extending beyond the power driven wheels and a rotatable steering wheel mounted on and supporting the opposite end, raising and lowering means mounted between the main frame and the auxiliary frame, an operator's station on said main frame, independent control means at the operator's station to control the raising and lowering of the scraper bowl and auxiliary frame and to steer the rotatable steering wheel, and also independently or simultaneously control each of the auxiliary transmissions.

8. In a self-propelled scraper, in combination, a main frame and an auxiliary frame, said main frame being supported at one end by independently controlled power driven wheels and the opposite end connected by oscillating means to the said auxiliary frame, said auxiliary frame having a scraper bowl with movable apron and movable back and control means mounted on one end in front of the independently controlled power driven wheels and supported by raising and lowering means mounted on the main frame and a steerable wheel mounted on and supporting the opposite end, a power plant with control means and an operator's station mounted on the said main frame, steering mechanism mounted on the auxiliary frame and attached to the steerable wheel, control means at the operator's station to independently control the steering of the steerable wheel and the rotation, clutching, declutching and braking of the independently controlled power driven wheels, the raising and lowering of the scraper bowl and the auxiliary frame and the movements of the movable back and apron of the scraper bowl.

9. In a self-propelled scraper, in combination, a main frame and an auxiliary frame, said main frame being supported at one end by independently controlled power driven wheels and the opposite end connected by oscillating means to the said auxiliary frame, said auxiliary frame having a scraper bowl with movable apron and movable back and hydraulic control means mounted on one end in front of the independently controlled power driven wheels and supported by hydraulic power raising and lowering means mounted on the main frame and a steerable wheel mounted on and supporting the opposite end, a power plant with control means and an operator's station mounted on the said main frame, hydraulic steering mechanism on the auxiliary frame and attached to the steerable wheel, hydraulic control means at the operator's station to independently control the steering of the steerable wheel and the rotation, clutching, declutching and braking of the independently controlled power driven wheels, the raising and lowering of the scraper bowl and the auxiliary frame and the movements of the movable apron and back of the scraper bowl.

10. In a self-propelled scraper, in combination, a main frame and an auxiliary frame, said main frame being supported at one end by independently controlled power driven wheels and the opposite end connected by oscillating means to the said auxiliary frame, said auxiliary frame having a scraper bowl with movable apron and movable back and hydraulic control means mounted on one end in front of the independently controlled power driven wheels and supported by power raising and lowering means mounted on the main frame and a steerable wheel mounted on and supporting the opposite end, a power plant with hydraulic clutching, declutching and braking means and an operator's station mounted on the main frame, hydraulic control means at the operator's station to independently control the steering of the steerable wheel and the rotation, clutching, declutching and braking of the independently controlled power driven wheels, the raising and lowering of the scraper bowl and auxiliary frame and the movements of the movable apron and back of the scraper bowl.

11. In a self-propelled scraper, in combination, a main frame and an auxiliary frame, said main frame being supported at one end by independently controlled power driven wheels and the opposite end connected by oscillating means to the said auxiliary frame, said auxiliary frame having a scraper bowl with movable apron and movable back and control means mounted on one end in front of the independently controlled power driven wheels and supported by links and bell cranks mounted on the main frame and a steerable wheel mounted on and supporting the opposite end, means mounted on said main frame and connected to said bell cranks to raise and lower the said auxiliary frame and the scraper bowl, a power plant with control means and an operator's station mounted on the said main frame, steering mechanism mounted on the auxiliary frame and attached to the steerable wheel, control means at the operator's station to independently control the steering of the steerable wheel and the rotation, clutching, declutching and braking of the independently controlled power driven wheels, the raising and lowering of the auxiliary frame and the scraper bowl and the movements of the movable apron and back of the scraper bowl.

12. In a self-propelled scraper, in combination, a main frame and an auxiliary frame, said main frame being supported at one end by independently controlled power driven wheels and the opposite end connected by oscillating means to the said auxiliary frame, said auxiliary frame having a scraper bowl with movable apron and movable back and hydraulic control means mounted on one end in front of the independently controlled power driven wheels and supported by links and bell cranks mounted on the main frame and a steerable wheel mounted on and supporting the opposite end, hydraulic means mounted on said main frame with a flexible connection to said bell cranks to raise and lower the said auxiliary frame and the scraper bowl, a power plant with control means and an operator's station mounted on the said main frame, hydraulic steering mechanism on the auxiliary frame and attached to the steerable wheel, hydraulic control means at the operator's station to independently or simultaneously control the steering of the steerable wheel and the rotation, clutching, declutching and braking of the independently controlled power driven wheels, the raising and lowering of the auxiliary frame and the scraper bowl and the movements of the movable apron and back of the scraper bowl.

13. In a self-propelled scraper, in combination, a main frame, an auxiliary frame and a sub-frame, said main frame being supported at one end by a non-rotatable axle with axle housing and independently controlled power driven wheels mounted thereon and the opposite end connected by oscillating means to the said auxiliary frame, said auxiliary frame having a scraper bowl with movable apron and movable back and control means mounted on one end in front of the independently controlled power driven wheels and supported by raising and lowering means mounted on the main frame and a steerable wheel mounted on and supporting the opposite end, said sub-frame being supported by the said axle housing and the said main frame and having mounted thereon an operator's station and a power plant with one main transmission and two auxiliary transmissions with braking means, steering mechanism mounted on the auxiliary frame and attached to the steerable wheel, control means at the operator's station to independently control the steering of the steerable wheel and the rotation, clutching, declutching and braking of the independently controlled power driven wheels, the raising and lowering of the auxiliary frame and the scraper bowl and the movements of the movable apron and back of the scraper bowl.

FRED D. WILSON.
LEONARD S. BURNS.